April 22, 1969 F. J. G. LEBRUN 3,440,356
AUTOMATICALLY COMPENSATING TELEPHONE SUBSTATION
Filed Sept. 22, 1965
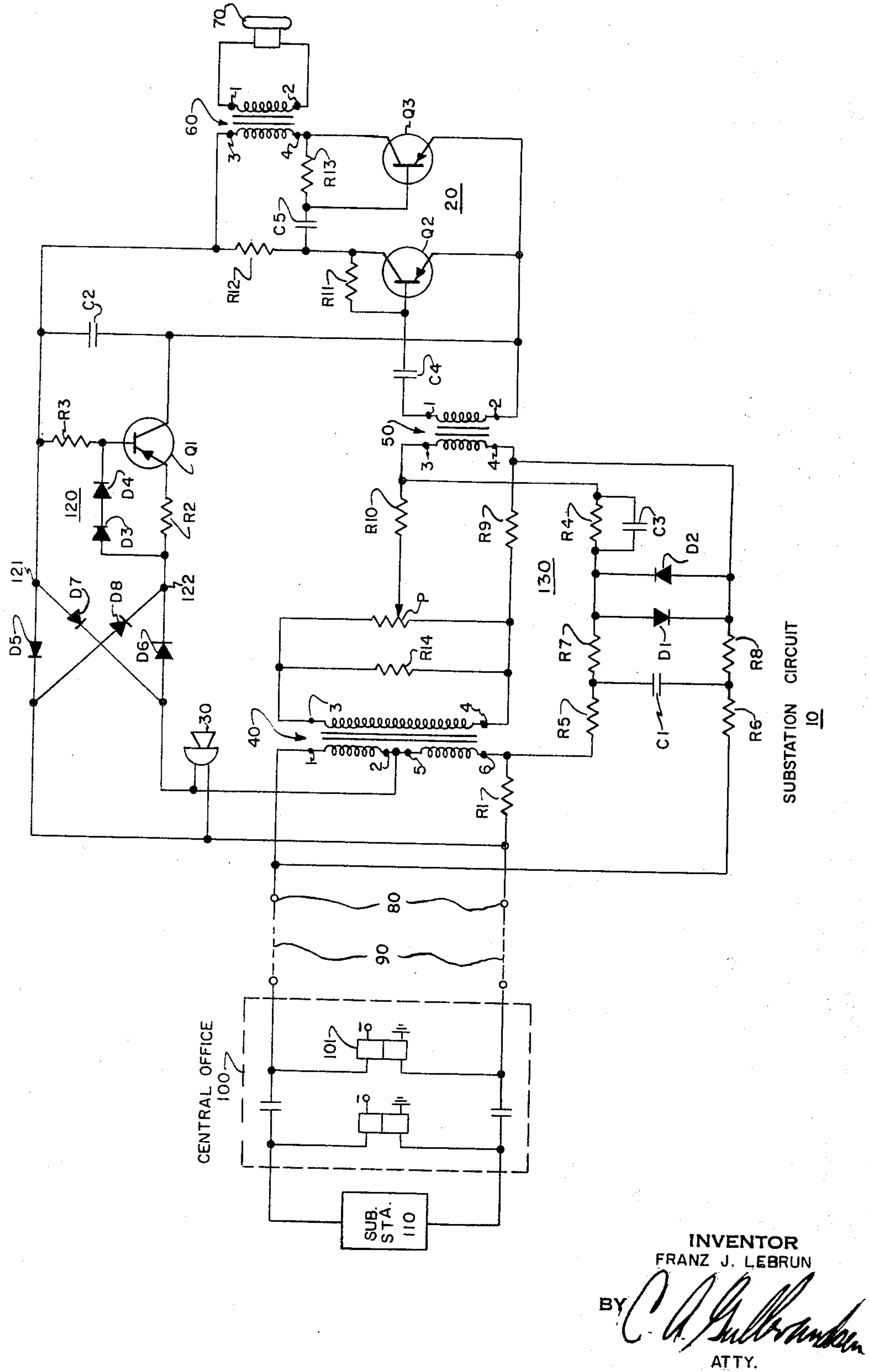
INVENTOR
FRANZ J. LEBRUN
BY C. A. Gullbrandsen
ATTY.

United States Patent Office 3,440,356
Patented Apr. 22, 1969

3,440,356

AUTOMATICALLY COMPENSATING TELEPHONE SUBSTATION

Franz Joseph Ghislain Lebrun, Celles-sur-Lesse, Houyet, Belgium, assignor to Automatic Electric Laboratories, Inc., Northlake, Ill., a corporation of Delaware Filed Sept. 22, 1965, Ser. No. 489,152
Int. Cl. H04m 1/02
U.S. Cl. 179—81 8 Claims

ABSTRACT OF THE DISCLOSURE

An anti-side tone bridge type subscriber station circuit, wherein the telephone line and the balancing impedance form two arms of a bridge, with two windings of the first transformer forming the other two arms. A transmitter is inserted across the bridge from a point at the junction at the line and balancing impedance to a junction of the two windings. The receiver input is taken from a third winding magnetically coupled to the first two windings of the transformer. A second transformer couples the third winding output of the bridge transformer to an amplifier, for amplifying the received signal, prior to supplying it to the receiving transducer. A non-linear impedance element is connected into the circuit whereby its characteristic operating point is set by the direct current potential supplied to the circuit, as determined by the impedance at the telephone line, to provide a compensatory shunt for the received signal across the input of the third winding of the first transformer.

This invention relates to telephone substation circuits and particularly to substation circuits which include automatic compensation for the length of the line loop.

The object of this invention is to provide a telephone substation circuit with an automatic compensation network for maintaining an output level at the receiver which is substantially independent of the length of the subscriber line to which the substation is attached.

One feature of this invention is that a non-linear impedance means, which has an impedance value controlled by the direct current potential at the terminals of the substation, is used in the receiver circuit to control the level of the signal output at the receiver. Another feature of this invention is that the non-linear impedance means is connected in the substation in such a manner that only the receiver signal and not the transmitter signal is affected by it. A further feature is that a transistor amplifier is incorporated in the receiver circuit to counterbalance the attenuation caused by the non-linear impedance means.

Other objects and features of this invention, and a clear understanding thereof, will be gained from a consideration of the following detailed description in conjunction with the drawing which shows a substation circuit incorporating the features of this invention.

The drawing shows a substation circuit 10 with terminals 80 connected to a transmission line 90 which leads to a central office 100. The central office 100 includes a source of direct current potential 101. The transmission line 90 supplies the substation circuit 10 with speech signals and a direct current potential at terminals 80 which has a value dependent upon the length of the transmission line 90. The relationship between the length of the transmission line 90 and the direct current potential at terminals 80 is an inverse one so that the longer the transmission line the smaller the direct current potential at terminals 80.

The substation circuit 10 consists essentially of the transmitter 30, the transformers 40, 50, and 60, the receiver 70, the transistor amplifier 20, the regulated power supply circuit 120, and the compensating network 130. The transmitter 30 is interconnected with the line 90, the windings 1–2 and 5–6 of transformer 40, and resistor R1 in a bridge arrangement which provides for anti-sidetone and effective utilization of the transmitter power. The operation of this anti-sidetone bridge arrangement is well known and will not be discussed in detail here.

The speech signals arriving at terminals 80 from the central office 100 are coupled through serially-connected windings 1–2 and 5–6 into windings 3–4 of transformer 40, through the network comprised of resistances R14, R10, and R9, and potentiometer P to transformer 50, through transformer 50, amplifier 20, and transformer 60 into the receiver 70. The transistor amplifier 20 is a two stage, common-emitter amplifier which is powered by a direct current potential from power supply circuit 120. The power supply circuit 120 is bridged across the transmitter 30 and consists essentially of a polarity switch, a series regulator and a shunt capacitor. The polarity switch is composed of diodes D5, D6, D7, and D8 arranged such that the polarity at points 121 and 122 is the same regardless of the polarity of the voltage across the line 90. The series regulator is of a well known type, consisting of transistor Q1, diodes D3 and D4, and resistances R2 and R3. The direct current potential taken across the transmitter varies as the length of the line varies, so the series regulator is used to stabilize the potential supplied to the amplifier 20. Diodes D3 and D4 provide a reference voltage drop for the regulator so that when the voltage drop across resistance R2 and the base-emitter junction of transistor Q1 equals the voltage drop across the diodes D3 and D4, the emitter current of transistor Q1 reaches a steady value. Since the power supply circuitry must be connected across the transmitter without appreciably weakening the voice signal generated by the transmitter, the capacitor C2 is isolated from the transmitter by the total resistance of the polarity switch, R2, and the emitter collector resistance of transistor Q1. The purpose of the capacitor C2 is to smooth the direct current voltage supplied to the amplifier 20 against the fluctuations produced by the transmitter and the alternating signal rectified by the polarity switch. This prevents any singing in the receiving amplifier. The direct current consumption of the power supply circuitry reduces the efficiency of the transmitter to some extent, but this loss of transmitter current is kept at a minimum by the current limiting effect of the regulator.

The compensating network 130 is connected across the terminals 1 and 6 of transformer 40 at one end and across the terminals 3 and 4 of transformer 50 at the other end. The resistances R5, R6, R7, and R8 combine with the other elements of the compensating network to provide a high input impedance which prevents the compensating network from decreasing the overall input impedance of the substation circuit. The diodes D1 and D2 are oppositely poled so that, depending on the polarity across the line 90, one of the diodes will be conducting and the other will be cut off. The amount of direct current passing through the conducting diode determines the impedance of the diode. The amount of direct current passing through the conducting diode is determined by the voltage drop which exists across it, and this voltage drop is dependent on the voltage drop across the terminals 1 and 6 of the transformer 40. The voltage drop across terminals 1 and 6 is dependent on the voltage drop across the terminals 80, which is in turn dependent upon the length of the transmission line 90. Thus, the impedance of the conducting diode is dependent upon the length of the transmission line 90. Since the conducting diode is also bridged across the winding 3–4 of transformer 50, some of the speech signals coming from winding 3–4 of transformer 40 will bypass winding 3–4 of transformer 50, and will be coupled through the conducting diode. The amount of the speech signal to be shunted through the conducting diode is dependent upon the impedance of the diode. Therefore, when the transmission line 90 is long, the potential across terminals 1 and 6 of transformer 40 is small, the current passing through the conducting diode is small, and the impedance of the conducting diode is correspondingly large, so that only a small portion of the speech signal is shunted through the conducting diode. On the other hand, when the transmission line 90 is short, the potential across terminals 1 and 6 of transformer 40 is large, the direct current through the conducting diode is large, and the impedance of the conducting diode is correspondingly small, so that a large portion of the speech signal is shunted through the conducting diode. The resistance R4 in the compensating network 10 is used to set the operating bias on the diodes so that they operate in the desired region of their current-voltage characteristic.

With the compensating network connected across the terminals 1 and 6 of the transformer 40, the speech signal output of the transformer 40 does not pass through the diodes, so that there is no attenuation of the speech signal output of the transmitter caused by the compensating network.

The following is a table which gives a representative example of the values and types of the components used in the substation circuit shown in the drawing:

| | | |
|---|---|---|
| Resistance R1 | ohms | 560 |
| Resistance R2 | do | 47 |
| Resistance R3 | do | 4.7K |
| Resistance R4 | do | 22K |
| Resistances R5, R6 | do | 4.7K |
| Resistances R7, R8 | do | 2.2K |
| Resistances R9, R10 | do | 4.7K |
| Resistance R11 | do | 10K |
| Resistance R12 | do | 1K |
| Resistance R13 | do | 39K |
| Resistance R14 | do | 820 |
| Potentiometer P | do | 500 |
| Capacitor C1 | μf | 2.2 |
| Capacitor C2, C3, C4, C5 | μf | 64 |
| Diodes D1 and D2 | | 1N459 |
| Diodes D3, D4, D5, D6, D7, D8 | | 0A5 |
| Transistors Q1, Q2, Q3 | | 2N404 |
| Transformer 40: | | |
| Winding 1–2 | | 27 ohms—1500 turns |
| Winding 3–4 | | 25 ohms—1000 turns |
| Winding 5–6 | | 140 ohms—1000 turns |
| Transformer 50: | | |
| Winding 1–2 | | 37 ohms—1510 turns |
| Winding 3–4 | | 500 ohms—5350 turns |
| Transformer 60: | | |
| Winding 1–2 | | 19 ohms—1800 turns |
| Winding 3–4 | | 33 ohms—980 turns |

The above description of the circuit and the listing of component values and types are by way of example only and are not intended to limit the scope of the invention as claimed in the following claims.

What is claimed is:

1. In a telephone system having a central office including a source of direct current potential, substation circuits, and transmission lines of varying length for supplying said substation circuits with speech signals and direct current potentials at values varying with the length of the transmission lines; a substation circuit comprising a pair of input terminals connected to one of said transmission lines, a transmitter, a receiver, a line balancing network, a first transformer having a first winding, a second winding and a third winding, a second transformer having a primary and a secondary winding, first circuit means coupling speech signals to said second transformer primary winding from said first transformer's third winding, second circuit means coupling speech signals to said receiver from said second transformer secondary winding, said circuit connected up so there is a series conducting path from one line terminal, through the first and second windings of the first transformer, and through said line balancing network to the other terminal, said transmitter connected into said circuit across the series combination of said second winding and line balancing network, non-linear impedance means having an impedance value varying with the direct current potential thereacross, third circuit means connecting said non-linear impedance means across the series combinations of said first and second windings of said first transformer to vary the impedance of said non-linear impedance means in accordance with the direct current potential thereacross, and fourth circuit means connecting said non-linear impedance means in shunt across said primary windings of said second transformer to control the level of the speech signals coupled to said receiver, by the shunt impedance thereof as determined by the direct current potential thereacross.

2. The combination as claimed in claim 1 wherein said second circuit means includes a transistor amplifier to amplify the speech signals coupled to said receiver.

3. The combination as claimed in claim 2 wherein said substation circuit further comprises fifth circuit means connected across said transmitter to supply direct current potential to said transistor amplifier, said fifth circuit means including a diode polarity switch and a series current regulator.

4. The combination as claimed in claim 2 wherein said first circuit means includes a potentiometer to set the amplification level of said transistor amplifier.

5. The combination as claimed in claim 1 wherein said non-linear impedance means is a pair of oppositely poled diodes, one of said diodes conducting if one polarity condition exists on said transmission line and the other of said diodes conducting if a second polarity condition exists on said transmission line.

6. The combination as claimed in claim 1 wherein said third circuit means includes a high impedance means to prevent said non-linear impedance means from lowering the input impedance of said substation circuit.

7. The combination as claimed in claim 1 wherein said nonlinear impedance means is a diode.

8. The combination as claimed in claim 2 wherein said fourth circuit means includes a resistor to set the direct current operating bias on said diode.

References Cited

UNITED STATES PATENTS

| | | | |
|---|---|---|---|
| 3,046,354 | 7/1962 | Clemency | 179—81 |
| 3,350,510 | 10/1967 | Knauer | 179—81 |

KATHLEEN H. CLAFFY, *Primary Examiner.*

BARRY PAUL SMITH, *Assistant Examiner.*